June 29, 1937.  N. H. REYNOLDS  2,085,333
ROPE SOCKET
Filed March 13, 1936   2 Sheets-Sheet 2

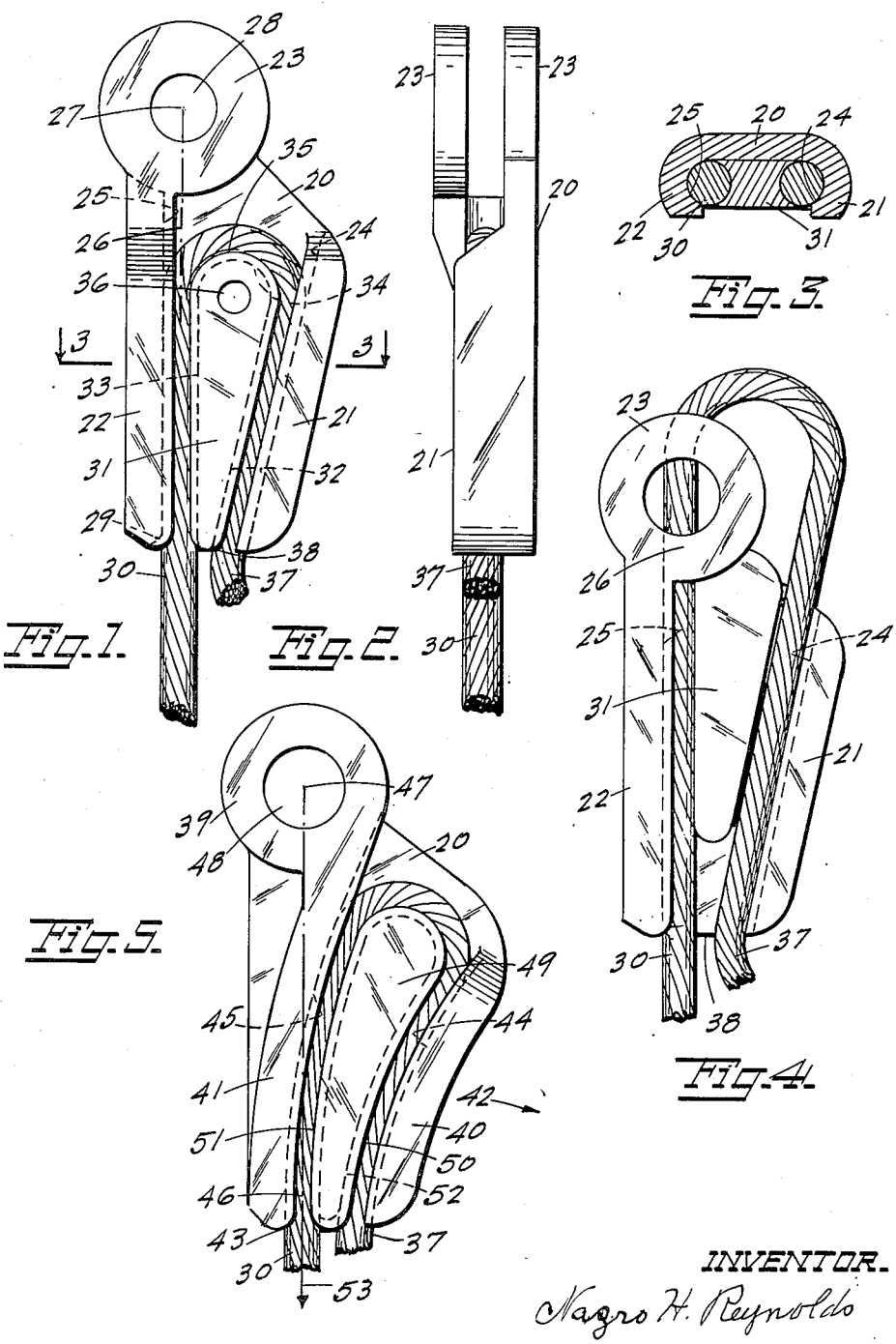

INVENTOR.
Nagro H. Reynolds

Patented June 29, 1937

2,085,333

UNITED STATES PATENT OFFICE 2,085,333

ROPE SOCKET

Nazro H. Reynolds, Alameda, Calif.

Application March 13, 1936, Serial No. 68,623

4 Claims. (Cl. 24—136)

This invention, a rope socket, is a distinct improvement over existing types of rope sockets, and is applicable in any case where a rope or cable is to be attached to a device or structure, such as in connection with excavating machinery, hoists, tuggers, winches, draglines and guy wires.

Due to its specific design and construction, this socket may be attached at any point along a cable or rope, irrespective of its length, and which is a feature which is not practical with existing types of rope sockets.

Some existing types of sockets are called "open sockets" but are merely a closed socket with open ends, and the disadvantage of this type of socket lies in the fact that before the socket can be applied, the end of the cable or rope must be cut clean or bound, since it is practically impossible to pass a frayed end back through the socket.

Another disadvantage of the closed socket lies in the fact that the release of the wedge is extremely difficult and in many cases impossible, since no access is attainable to the wedge except to the narrow end which lies between the end of the rope and main portion. Therefore, should the rope or cable require taking up, or should it be desired to reverse the rope end for end, it is usually necessary to cut off the rope at the socket and use a new socket. Also, the rope may not permit the loss of that section, becoming too short.

All of the above disadvantages are overcome by this invention, which is so designed and arranged that the rope or cable is very securely locked in the socket, and the heavier the pull, the tighter the grip. However, should it be necessary to remove the rope from the socket, this removal may be accomplished with a minimum of effort and loss of time, since the wedge is completely accessible and readily pushed or driven out. With this socket, well bound or clean cut ends are unnecessary, since no amount of fraying will affect the rapidity or ease of application of the rope in the socket.

It is a known fact that if a wire rope or cable is changed end for end when any reasonable evidence of wear is noticed that the life of the rope is practically doubled. Taking into consideration the time required to change the sockets at both ends of the rope, (which are usually different from each other), and the time lost in operation during the rope change, such changes are not attempted on the average, as the cost of the rope is thus of minor importance. However, when this invention is used, the change can be made so quickly that a very substantial saving is effected, there being practically no time loss on the job.

The objects of the invention are as follows:

First; to provide a wedge rope-socket in which the wedge is completely accessible for removal.

Second; to provide a socket of the type outlined, in which frayed rope ends will not hamper in any manner the insertion and locking of the rope in the socket.

Third; to provide a socket as outlined from which the rope can be easily and quickly removed while securely locking the rope until such removal is desired, and in which frayed rope ends in no way hamper the removal of the rope from the socket.

Fourth; to provide an actual open socket and a complementary wedge frontally received in the socket.

Fifth; to provide an open socket in which a loop formed at any point throughout the length of a rope, may be laid directly into the socket, and to provide a wedge which can be laid within the loop and drawn into position by a pull on one or both strands of the rope, and in which the rope locks the wedge in the socket while simultaneously the wedge secures the rope in the socket.

Sixth; to provide a socket as outlined with a wedge and gib of such form as may be most desirable for the specific purpose, and which wedges may be formed with plane faces, curved faces, or with angularly related straight sides, or with sides divergently curved in the same direction from different centers, all of which types are operated and attached in the same manner.

Other objects and advantages of the invention will become apparent as the following description is read on the drawings forming a part of this specification, and in which similar reference characters are used to designate similar parts throughout the several views, of which;

Fig. 1 is a front elevation of the invention.

Fig. 2 is a side elevation of Fig. 1.

Fig. 3 is a section taken on line 3—3 of Fig. 1.

Fig. 4 is a view similar to Fig. 1 except showing the wedge and rope laid in position ready for securing the rope in the socket and with the hole 36 omitted.

Fig. 5 is a modification of the invention, showing a side-curved wedge socket.

Figure 6:
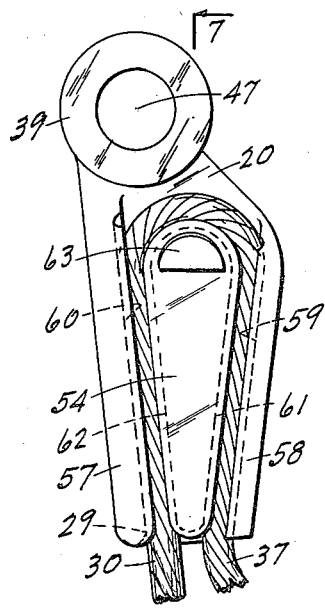
Fig. 6 is a second modification of the invention showing a front-curve wedge.

The invention consists of an open front, or semi-socket comprising a back wall 20 with forwardly-projecting integral rope gibs or side walls 21 and 22 which form a wedge-receiving recess, and which gibs are divergently related to the eye 23, and each of which gibs have a rope groove preferably arcuate in cross-section, respectively 24 and 25, formed throughout their length, the groove 25 having its axis 26 perpendicular to, and intersecting the axis 27 of the pin bore 28, the lower end of this groove being flared as shown at 29 to prevent short whip or wear of the rope.

When the invention is to be applied intermediate the length of a rope or cable with a pull to be exerted on both strands, the two grooves 24 and 25 are located in equi-angular relation to the perpendicular axis 26.

The wedge 31 is formed to a thickness about equal or slightly greater than the diameter of the rope or cable and is frontally received in the socket, and is provided with grooves 32 and 33 in its side or tapered surfaces, these grooves being formed complementary to the grooves 24 and 25, and a cap-groove 34 of the same form is formed about the arcuate top 35 of the wedge.

A hole 36 is provided for drifting or driving the wedge out of the socket when the rope or cable is to be removed.

Referring to Fig. 4, the ease with which a rope or cable can be secured in the socket is plainly illustrated. The wedge is removed, the rope 30 is looped as shown and placed or laid frontally in the socket, (instead of being threaded through and back, as is customary), with the dead end 37 just protruding from the lower end 38 of the socket. The rope or cable will naturally spring into the grooves 24 and 25, after which the wedge 31 is laid between the legs 37 and 30 of the rope, after which a pull on rope 30 will draw the wedge in position, securing the rope in the socket, while the rope functions as a key in the complementary grooves of the socket and wedge, locking the wedge in the socket. For this reason the rope, socket and wedge are interdependent.

The heavier the draw or pull on the rope 30, the tighter the rope is gripped, and the tighter the wedge is locked in the socket.

The rope, however, is easily removed from the socket due to the fact that the front of the socket is entirely open and the wedge face completely exposed and accessible, and the hole 36 permits a bar to be inserted, and by driving the side of the bar with a hammer, the wedge is readily removed.

As is well understood, in existing types of sockets which are called open sockets, but which are actually closed sockets with open ends, the only part of the wedge which is accessible for removal purposes, is the very tip, corresponding to point 38, Fig. 1, and with the two legs 30 and 37 of the rope so close together, it is practically impossible to remove the wedge.

The side-curved wedge Fig. 5, is particularly designed for drums, winches, and other close-quarter installations, and for single-eye couplings in which the eye 39 is made in one solid section instead of two sections forming a yoke, as 23, in Figs. 1 and 2.

The structure is identical to that previously described other than the single eye 39, and the rope gibs 40 and 41 being arcuately formed and curved in the same direction, as 42, though in divergent relation as extended upwardly from the bottom 43, the rope grooves 44 and 45 being also semi-cylindrical in cross-section and formed in the inside faces of the gibs, the groove 45 passing outside the eye 39 and falling at its lower end into a tangent 46 perpendicular to the axis 47 of the bore 48.

The wedge 49 has its side edges 50 and 51 formed complementarily to the inside faces of the gibs and is provided with an encompassing, semi-cylindrical groove 52. As in the previous description, the rope operates as a key for locking the wedge in the socket, while the wedge coincidently operates to secure the rope in the socket. This side-curved wedge may more clearly be described as a concavo-convex wedge, since the side 50 is concavely formed and the side 51 is convexly formed.

Figure 7:
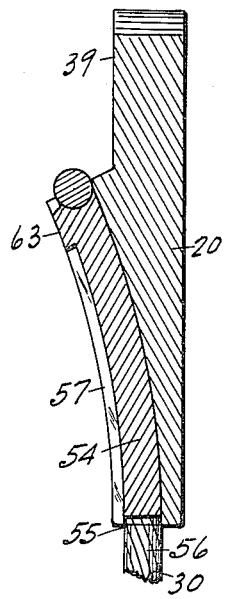
Fig. 7 is a section taken on line 7—7 of Fig. 6.

The front-curved or upcored socket, Figs. 6 and 7, is particularly designed for dragline frogs and varies from those previously described in having a wedge 54 which in plain view, or front elevation, is similar to the wedge of Figs. 1 and 2, but is curved frontally or upwardly to pass in front of the eye 39, instead of to the side as that of Fig. 5, the grooves leaving the lower end of the socket, as at 55, on a tangent 56 perpendicular to the longitudinal center and axis 47 of the eye, the gibs 57 and 58 in plan view appearing similar to those in Figs. 1 and 2, while being curved upwardly or forwardly as shown in Fig. 7, forming a concave recess for the concavo-convex wedge shown in Figs. 6 and 7, and with the upwardly or forwardly curved grooves 59 and 60 forming the rope-receiving key-grooves.

The wedge 54 is formed complementary to the wedge socket, with the rope grooves 61 and 62 formed complementary to the grooves 59 and 60. A driving lug 63 is shown as a modification over the hole 36 for removal of the wedge from the rope and socket.

Figure 8:
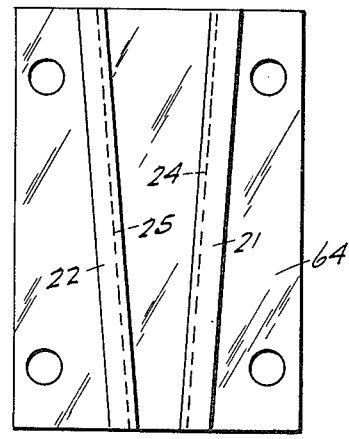
Fig. 8 is a plan view of the base member of the clamp modified for deck and pillar installations.

In Fig. 8 is shown a deck attachment 64, the form of which may be modified to suit any mounting condition. This form is for use in connection with guy wires, fixed terminals, and in any case where a cable or rope is to be permanently fixed to a structure.

Figure 9:
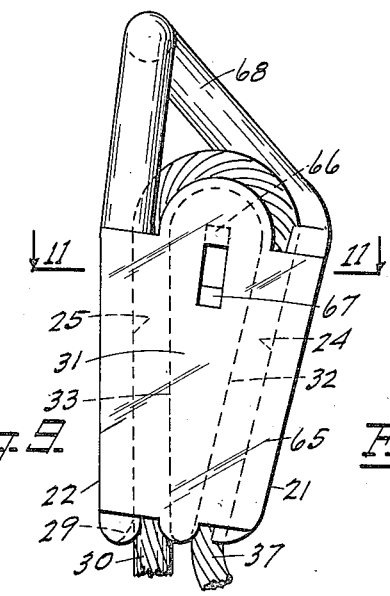
Fig. 9 is a fourth modification of the invention showing a cap-wedge and with the socket arranged with a chain eye.
Figure 10:
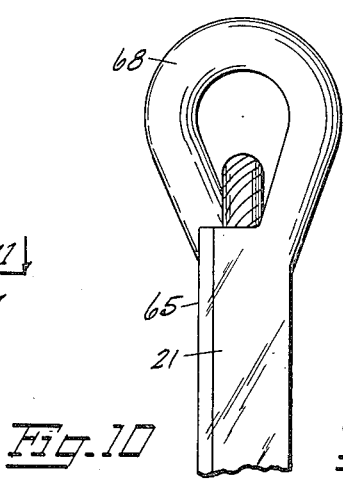
Fig. 10 is a fragmentary side elevation of Fig. 9.
Figure 11:
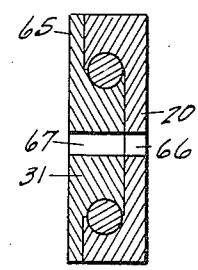
Fig. 11 is a section taken on line 11—11 of Fig. 9.

In Figs. 9, 10 and 11, a covered wedge is shown which is similar to those previously described except that a cover 65 is formed integrally with the wedge and covers the secured portion of the rope. With this arrangement the gripped portion of the rope is protected and may be provided with a protective material, such as paint or lubricant.

Also, drift pin slots 66 and 67 are shown for removal of the wedge in lieu of the hole 36 or lug 63, and the socket is provided with a chain loop or eye for coupling to a chain.

It will be noted that the curved wedges can also be used with closed sockets and it is intended that the invention shall cover this type of wedge irrespective of the type of socket.

It will be understood that variations in construction and arrangement of parts, which variations are consistent with the appended claims, may be resorted to without detracting from the spirit or scope of the invention, or sacrificing any of the advantages thereof.

I claim:

1. A rope securing device comprising a socket having an eye formed at one end thereof, a wedge-receiving recess formed in said socket and having curved side walls with a rope-receiving groove formed in each side wall with one groove terminating at the other end of the socket tangentially to the center of said eye, the longitudinal axes of said grooves being uniformly curved in the same direction from said other end toward said one end and passing outwardly curvilinearly beyond and completely clearing said eye, whereby a wedge curved to conform to said recess, with a rope looped thereabout, during insertion or removal is moved through a curved path spacedly related to said eye.

2. A rope-securing device comprising a curved wedge, a socket having an eye formed at the upper end and a wedge-receiving recess having side walls and formed in said socket below said eye, said socket having a total length substantially equal to the length of said recess plus the diameter of said eye providing a coupling of minimum length, said side walls being arcuately formed and having a rope-receiving groove formed throughout the length of each wall, one of said side walls terminating at its lower end substantially tangentially to the center of said eye, and both side walls curving uniformly outwardly from the lower end toward said upper end and terminating at the upper end in outwardly-spaced relation to said eye, whereby said wedge with a rope looped thereabout is moved through a curved and divergent path as related to said eye during insertion and removal, clear of obstructional influence of said eye or elements which may be located in or on said eye.

3. A rope securing device comprising a wedge uniformly curved forwardly from bottom to top, and a socket member having a recess formed in the lower portion thereof for receiving said wedge with a rope looped thereabout, and having side walls and a back wall uniformly curved to conform with the curvature of said wedge, whereby insertion and removal of said wedge and rope is conducted through a curved and divergent path clearing the front face of the upper portion of said socket member in spaced and divergent relation.

4. A rope securing device comprising a wedge having a concave front wall and a convex back wall and divergent side walls with a rope-receiving groove formed in each side wall, a socket member having a straight rear wall and an eye formed at the upper end of the socket member, and a wedge-receiving recess having a concave back wall terminating at its lower end in a tangent parallel to said rear wall and terminating at its upper end adjacent the lower edge of said eye and in outwardly or forwardly spaced relation thereto, and formed in said socket member, whereby said wedge with a rope looped thereabout is insertible and removable through a curved path in spaced and divergent relation to the front face of said eye.

NAZRO H. REYNOLDS.